(No Model.) 2 Sheets—Sheet 1.

G. P. KIRSCH.
LAWN MOWER.

No. 527,697. Patented Oct. 16, 1894.

Witnesses.
Robert Everitt.
G. W. Rea.

Inventor.
George Peter Kirsch.
By James L. Norris.
Atty.

(No Model.) 2 Sheets—Sheet 2.

G. P. KIRSCH.
LAWN MOWER.

No. 527,697. Patented Oct. 16, 1894.

Witnesses,
Robert Everett,
G. W. Rea.

Inventor.
George Peter Kirsch.
By
James L. Norris.
Atty.

UNITED STATES PATENT OFFICE.

GEORGE PETER KIRSCH, OF DECATUR, INDIANA.

LAWN-MOWER.

SPECIFICATION forming part of Letters Patent No. 527,697, dated October 16, 1894.

Application filed July 3, 1894. Serial No. 516,483. (No model.)

*To all whom it may concern:*

Be it known that I, GEORGE PETER KIRSCH, a citizen of the United States, residing at Decatur, in the county of Adams and State of Indiana, have invented new and useful Improvements in Lawn-Mowers, of which the following is a specification.

My invention relates to improvements in lawn mowers and particularly to that class of lawn mowers wherein are employed reciprocating cutter bars, and has for its objects to provide mechanism for communicating to the cutter bars a rising and falling movement to prevent the knives clogging; to provide improved mechanism for actuating the knives; to provide improved noiseless mechanism for throwing out of gear said actuating mechanism when the machine is moved backward, and to improve and simplify the construction of this class of mowers generally.

To these ends my invention consists in the novel construction, arrangement and combination of parts hereinafter fully described and definitely pointed out in the claims following the description, due reference being had to the accompanying drawings, forming a part of this specification, wherein—

Figures 1, 2:
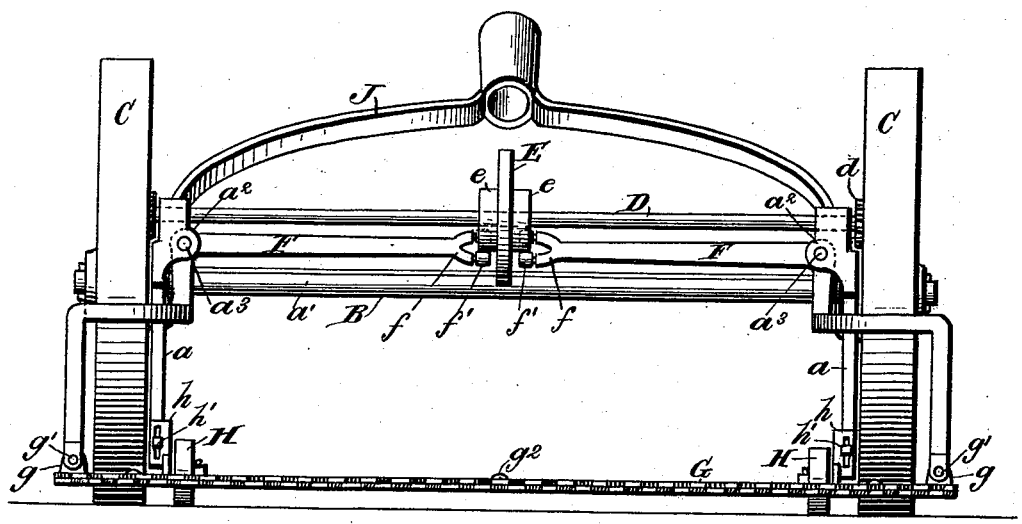
Figure 3:
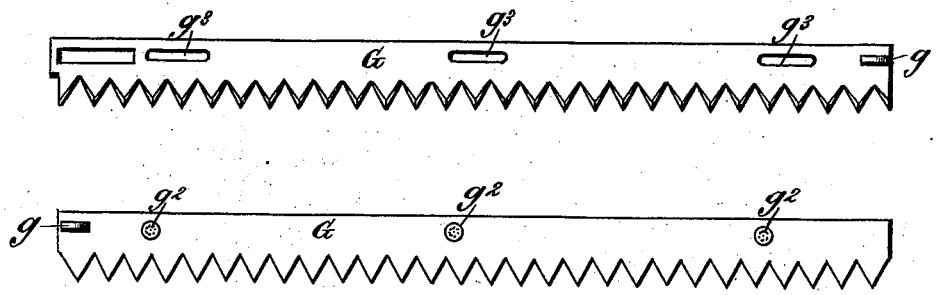
Figure 4:
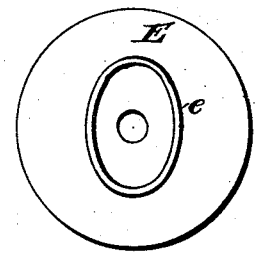
Figure 5:
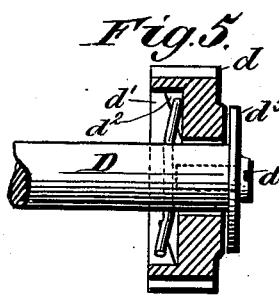
Figure 6:
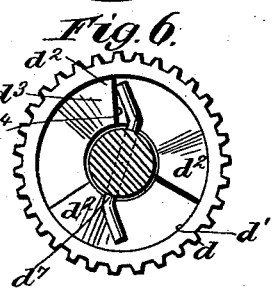
Figure 7:
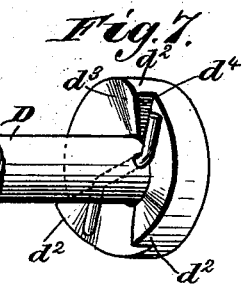

Figure 1, is a front end elevation of my improved mower. Fig. 2, is a vertical section taken transversely of the cutter bars. Fig. 3, is a plan view of the cutter bars detached. Fig. 4, is a side elevation of the operating cam, and Fig. 5, a detail sectional view showing the clutch mechanism for connecting the pinions to their shaft; Fig. 6, an end view thereof; and Fig. 7, a perspective view of the ratchet mechanism, a portion of the pinion being omitted to more clearly illustrate the operation of the parts.

As shown in the drawings, the various parts of my machine are carried by a frame consisting of two side bars A provided with downwardly and forwardly curved arms $a$, said side bars being firmly united by a tie rod $a'$ and the axle B, the latter projecting for a suitable distance through said side bars for the reception of the drive wheels C which are loosely journaled on the ends thereof and turn freely thereon. The drive wheels C are provided with internal peripheral gears $c$, for the purpose hereinafter described.

D indicates a shaft journaled in bearings formed in the upper portion of the side bars A and at its opposite ends is provided with ratchet gear pinions $d$, meshing with the internal gears $c$, on the drive wheels C. On the shaft D, midway between its ends, is rigidly secured a cam wheel E provided upon each side with a raised or flanged cam $e$, of elliptical configuration, the major axes of the cams $e$, lying in parallel, horizontal and vertical planes.

The side bars A, at a point slightly below the bearings of the shaft D, are provided with inwardly projecting ears or lugs $a^2$, between which are pivoted by pins or bolts $a^3$, bell-crank levers F, each of which, at its inner end is bifurcated to form a yoke $f$, upon the two members of which are journaled friction rollers $f'$ which are adapted to bear against the inner and outer face of the cam $e$. The other ends of the bell-crank levers F are bent forwardly and outwardly as shown and at their extreme ends are bifurcated for the attachment thereto of the cutter bars G, consisting of serrated knives each provided at its outer end with an upwardly projecting, perforated lug $g$, which is fitted in the bifurcated end of one of the bell-crank levers F and pivotally secured thereto by a bolt $g'$.

The cutter bars G overlap each other and are held in their proper relation one to the other by means of bolts $g^2$ passing through suitable elongated slots $g^3$, formed in either or both of said cutter bars. To the free ends of the arms $a$, of the side bars A are secured small caster wheels H. Said wheels are journaled in brackets $h$, which are provided with elongated bolt holes through which, and through bolt holes formed in the ends of the arms $a$, pass bolts $h'$, by means of which the said wheels may be raised and lowered for the purpose hereinafter described.

The rear ends of the side bars A are provided with sockets I, for the reception of a handle J, said handle being held in place in said sockets by locking pins or bolts $i$, passing through said handle and through the side bars. The said handle also aids in tying the side bars A together.

The operation of my improved mower will be readily understood. As the machine is propelled forward over the lawn the internal peripheral gears c, of the driving wheels C communicate a rapid rotary movement to the cam wheel E through the medium of the ratchet gear wheels $d$, and shaft D. As said cam wheel is rotated the cams $e$, simultaneously communicate a rocking movement to the bell-crank levers F about their pivots $a^3$, causing the cutter bars G to be rapidly reciprocated one past the other and mow the grass in the well known manner. As the bell-crank levers are rocked on their pivots $a^3$, their lower ends, to which the cutter bars are attached, are caused to move in the arc of a circle of which the pivot $a^3$, is the center, thus causing the cutter bars as they are reciprocated one past the other to rise and fall, shaking off the grass from the knives and preventing the latter from clogging. The cam wheel E also acts as a fly wheel serving to steady and balance the shaft D in its rotation. By loosening the bolts $h'$ which serve to attach the brackets $h$, carrying the caster wheels H to the arms $a$, said wheels may be raised or lowered to alter the height of the cut by the knives. In drawing the machine backward the knives will not be operated, the ratchet pinions $d$, in such case rotating idly upon the ends of the shaft D. Said pinions may be ratchet pinions of ordinary and well known construction, but in order to avoid the noise resulting from the employment of such ratchet pinions I prefer to connect said pinions with the shaft in the following manner. Each of said pinions $d$ is provided upon one side with a circular recess $d'$ in the bottom of which are formed ratchet teeth $d^2$ the faces $d^3$ of which are gradually inclined upward and outward, as clearly shown in Figs. 5, 6 and 7, and terminate in abrupt, vertical walls or shoulders $d^4$. Each of said pinions is provided with a central aperture through which passes the end of the shaft D, a washer $d^5$ and screw $d^6$ serving to secure the pinion in place upon the shaft. A duplex rocking pawl $d^7$ consisting of a pin or rod having its opposite ends bent in reversed directions is loosely journaled in a transverse perforation formed in the shaft D near each end thereof and in juxtaposition to the inner face of the pinion. As the machine is moved forward the shoulder $d^4$ of one of the ratchet teeth $d^2$ will engage one end of the duplex rocking pawl $d^7$ and cause the shaft D to rotate in unison with the pinion, but when the machine is moved backward the ends of the pawls will slip idly over the ratchet teeth, for the pinions will then be revolved in the direction indicated by the arrow in Figs. 6 and 7, and the inclined faces $d^3$ of the ratchet teeth will alternately engage the opposite ends of the pawl $d^7$, the ratchet teeth being arranged at such distances apart that one end of the pawl will not be engaged by the inclined face of one of the teeth until the other end thereof has been disengaged by one of the other teeth, a rocking movement being thus imparted to the pawl which permits the pinion to revolve without rotating the shaft D.

As thus constructed I dispense with the use of springs entirely in the construction of the ratchet mechanism, thus avoiding all noise and materially adding to the durability of the machine.

Having described my invention, what I claim is—

1. In a mowing-machine, the combination with the frame and drive wheels, of two reciprocating cutter bars overlapping one another, and mechanism for communicating a combined reciprocating and rising and falling motion to said cutter bars, substantially as described.

2. In a mowing-machine, the combination with the frame and drive wheels, of two reciprocating cutter bars overlapping one another, bell-crank levers attached to said cutter bars and operating to communicate a combined reciprocating and rising and falling motion thereto, and mechanism operated by the drive wheels for simultaneously rocking said bell-crank levers, substantially as described.

3. In a mowing-machine, the combination with the frame and drive wheels, of two reciprocating cutter bars overlapping one another, bell-crank levers attached to said cutter bars and operating to communicate a combined reciprocating and rising and falling motion thereto, a shaft rotated by said drive wheels, and a cam wheel mounted on said shaft and provided on its opposite sides with cams engaging the ends of said bell-cranks to rock the latter, substantially as described.

4. In a mowing-machine, the combination with the frame and the drive wheels provided with internal peripheral gears, of a shaft journaled in said frame and carrying at its opposite ends ratchet pinions engaging said gears, a cam wheel rigidly mounted on said shaft and provided on its opposite sides with cams, downwardly depending bell-crank levers pivoted to said frame and engaging at their inner ends said cams, and overlapping cutter bars movably connected to each other and pivotally secured at their outer ends to said bell-crank levers, substantially as described.

5. In a mowing-machine, the combination with the frame and drive wheels provided with internal peripheral gears, of a shaft journaled in said frame and carrying at its opposite ends ratchet pinions engaging said gears, a cam wheel rigidly mounted on said shaft and provided on its opposite sides with elliptical cams, downwardly depending bell-cranks pivoted to said frame and each provided at its inner end with friction rollers engaging the opposite sides of the adjacent cam, and overlapping cutter bars movably connected to each other and pivotally secured at their outer ends to said bell-crank levers, substantially as described.

6. The herein described ratchet mechanism, consisting of a pinion loosely journaled on a shaft and provided upon one face with ratchet teeth having inclined faces, and abrupt shoulders and a duplex rocking pawl having reversely bent ends and journaled in a transverse aperture in the shaft, substantially as and for the purpose set forth.

In testimony whereof I have hereunto set my hand and affixed my seal in presence of two subscribing witnesses.

GEORGE PETER KIRSCH. [L. S.]

Witnesses:
MATTHIAS KIRSCH,
LEWIS C. DETOSS.